United States Patent
Wang et al.

(10) Patent No.: US 11,630,495 B2
(45) Date of Patent: Apr. 18, 2023

(54) DISPLAY APPARATUS AND METHOD FOR CONTROLLING THE SAME

(71) Applicant: DYNASCAN TECHNOLOGY CORP., Taoyuan (TW)

(72) Inventors: Tsun-I Wang, Taoyuan (TW); Ching-Chun Wu, Taoyuan (TW); Chia-Liang Yang, Taoyuan (TW)

(73) Assignee: DYNASCAN TECHNOLOGY CORP., Taoyuan (TW)

( * ) Notice: Subject to any disclaimer, the term of this patent is extended or adjusted under 35 U.S.C. 154(b) by 218 days.

(21) Appl. No.: 17/074,230

(22) Filed: Oct. 19, 2020

(65) Prior Publication Data

US 2022/0121255 A1  Apr. 21, 2022

(51) Int. Cl.
*G06F 1/20* (2006.01)
*G09G 5/10* (2006.01)

(52) U.S. Cl.
CPC .............. *G06F 1/206* (2013.01); *G09G 5/10* (2013.01); *G06F 2200/201* (2013.01); *G09G 2360/141* (2013.01); *G09G 2360/144* (2013.01)

(58) Field of Classification Search
None
See application file for complete search history.

(56) References Cited

U.S. PATENT DOCUMENTS

| 2011/0127026 A1* | 6/2011 | Schuch | G05D 23/1917 165/247 |
| 2016/0174723 A1* | 6/2016 | Chan | A47C 21/00 454/339 |
| 2017/0061898 A1* | 3/2017 | Takayanagi | H05B 47/11 |
| 2019/0340982 A1* | 11/2019 | Kim | G09G 3/2007 |

FOREIGN PATENT DOCUMENTS

| CN | 102102679 A | 6/2011 |
| CN | 205665490 U | 10/2016 |
| CN | 108170180 A | 6/2018 |
| JP | 2003015224 A | 1/2003 |
| JP | 2007101897 A | 4/2007 |
| JP | 2010091882 A | 4/2010 |

OTHER PUBLICATIONS

International Search Report and Written Opinion in International Patent Application No. PCT/CN2021/118789, dated Dec. 15, 2021, in 9 pages.

* cited by examiner

Primary Examiner — Andre L Matthews
(74) Attorney, Agent, or Firm — Duane Morris LLP

(57) ABSTRACT

A display apparatus and a method for controlling the same are provided. The display apparatus includes a display unit, a light sensor, a cooling fan, and a controller. The light sensor is configured to detect an ambient light and generate a brightness value indicating brightness of the ambient light. The cooling fan is configured to generating a fluid flow in the display apparatus. The controller is configured to monitor the brightness value per a time period and control a rotational speed of the cooling fan based on the brightness value.

22 Claims, 7 Drawing Sheets

DISPLAY APPARATUS AND METHOD FOR CONTROLLING THE SAME

BACKGROUND

1. Field of the Disclosure

The present disclosure relates to a display apparatus and a method for controlling the same. More particularly, the present disclosure relates to a display apparatus including cooling elements and a method of controlling the cooling elements.

2. Description of the Related Art

Temperature may affect the performance of an electronic device. The internal temperature of a display apparatus, for example, can strongly influence device performance. Since a display apparatus may include multiple elements which generate heat, such as backlight modules and controllers. To sustain acceptable device function, heat management is critical, frequently employing heat sinks and fans.

SUMMARY

In some situations, external heat may be transferred into a display device, such as from the sun for an outdoor display apparatus. In such a scenario, not only must internal heat from the elements of the display apparatus, but also external heat from the environment be adequately managed. The present disclosure relates to a novel display apparatus and method thereof to efficiently dissipate heat.

According to one embodiment, the present disclosure may be related to a display apparatus. The display apparatus comprises a display unit; a light sensor; a cooling fan; and a controller. The light sensor may be configured to detect an ambient light and generate a brightness value indicating brightness of the ambient light. The cooling fan may be configured to generating a fluid flow in the display apparatus. The controller may be configured to monitor the brightness value per a time period and control a rotational speed of the cooling fan based on the brightness value.

According to another embodiment, the present disclosure may be related to a display apparatus. The display apparatus further comprises a backlight module located on a first side of the display unit. The light sensor is located on a second side of the display unit different from the first side and faces away from the display unit. The controller is configured to control light emitted from the backlight module based on the brightness value.

According to another embodiment, the present disclosure may be related to a display apparatus. The display apparatus further comprises a backlight module located on a first side of the display unit. The light sensor is located on the backlight module and is configured to detect the ambient light and light emitted by the backlight module.

According to another embodiments, the present disclosure may be related to a method for controlling a display apparatus. The method comprises: generating a fluid flow in a display apparatus with a cooling fan; detecting ambient light of the display apparatus with a light sensor; generating a brightness value indicating brightness of the ambient light; monitoring the brightness value per a time period; and controlling a rotational speed of the cooling fan based on the brightness value.

BRIEF DESCRIPTION OF THE DRAWINGS

For a better understanding of the nature and objects of some embodiments of the present disclosure, reference should be made to the following detailed description taken in conjunction with the accompanying drawings. In the drawings, identical or functionally identical elements are given the same reference numbers unless otherwise specified.

DETAILED DESCRIPTION

For a display apparatus utilizing one or more fans for thermal management, it may not be practical to run cooling fans at a maximum speed all the time, in terms of excess energy consumption, unwanted noise generated, and device wear and tear shortening the life of the cooling fans. As well, in some cases, some elements of a display apparatus require a warmup, and constantly running fans at the maximum speed will extend the length of the warmup.

While, generally, the brighter (e.g., lumens) sunlight is, the more heat (e.g., joules) is provided thereby, such as at noon compared to other times of day. However, in the case of an outdoor display apparatus receiving irradiation from the sun at noon, the heat accumulated in the display device increases rapidly and significantly. Arrival at the highest internal temperature may be later than the time at which the sun generates the highest actual brightness, since the device's internal temperature may be further increased by heat accumulation.

Figure 1:
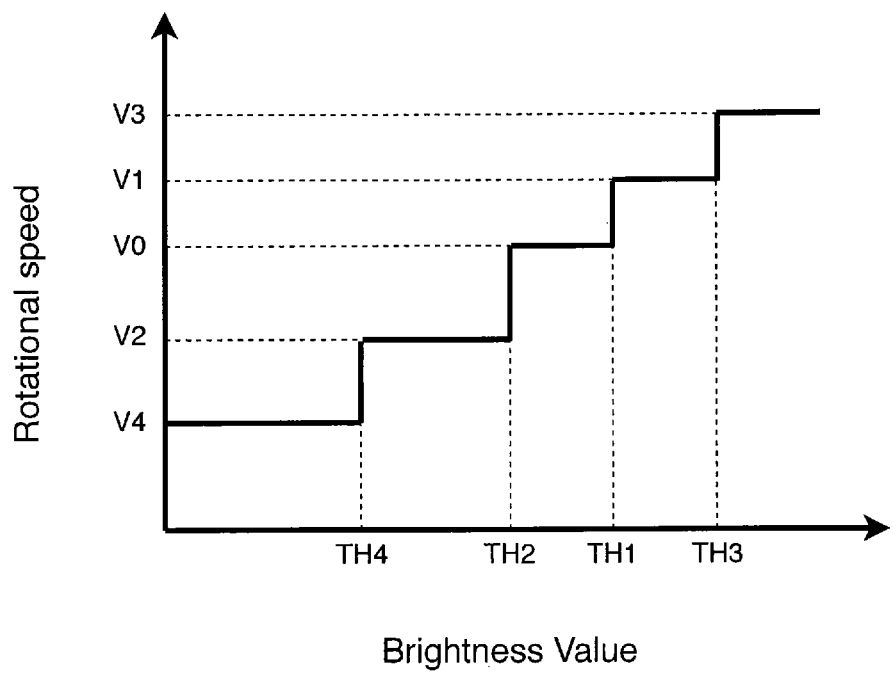
FIG. 1 illustrates the relationship between brightness values and rotational speeds according to some embodiments of the present disclosure.

In view of the above, it is preferable to increase the rotational speed of a cooling fan before arrival at the highest internal temperature. According to the present disclosure, a method for controlling the fan based on the brightness value of ambient light is provided. FIG. 1 illustrates the relationship between brightness values and rotational speeds according to some embodiments of the present disclosure. For example, a controller of a display apparatus (e.g., the controller 11 in FIG. 8 or 9) may control one or more cooling fans (e.g., fans 131 and 132 in FIGS. 8 and 9) according to the relationship shown in FIG. 1. According to the relationship shown in FIG. 1, a controller of a display apparatus may monitor the brightness value and control the rotational speed of one or more cooling fans based thereon.

Figure 8:
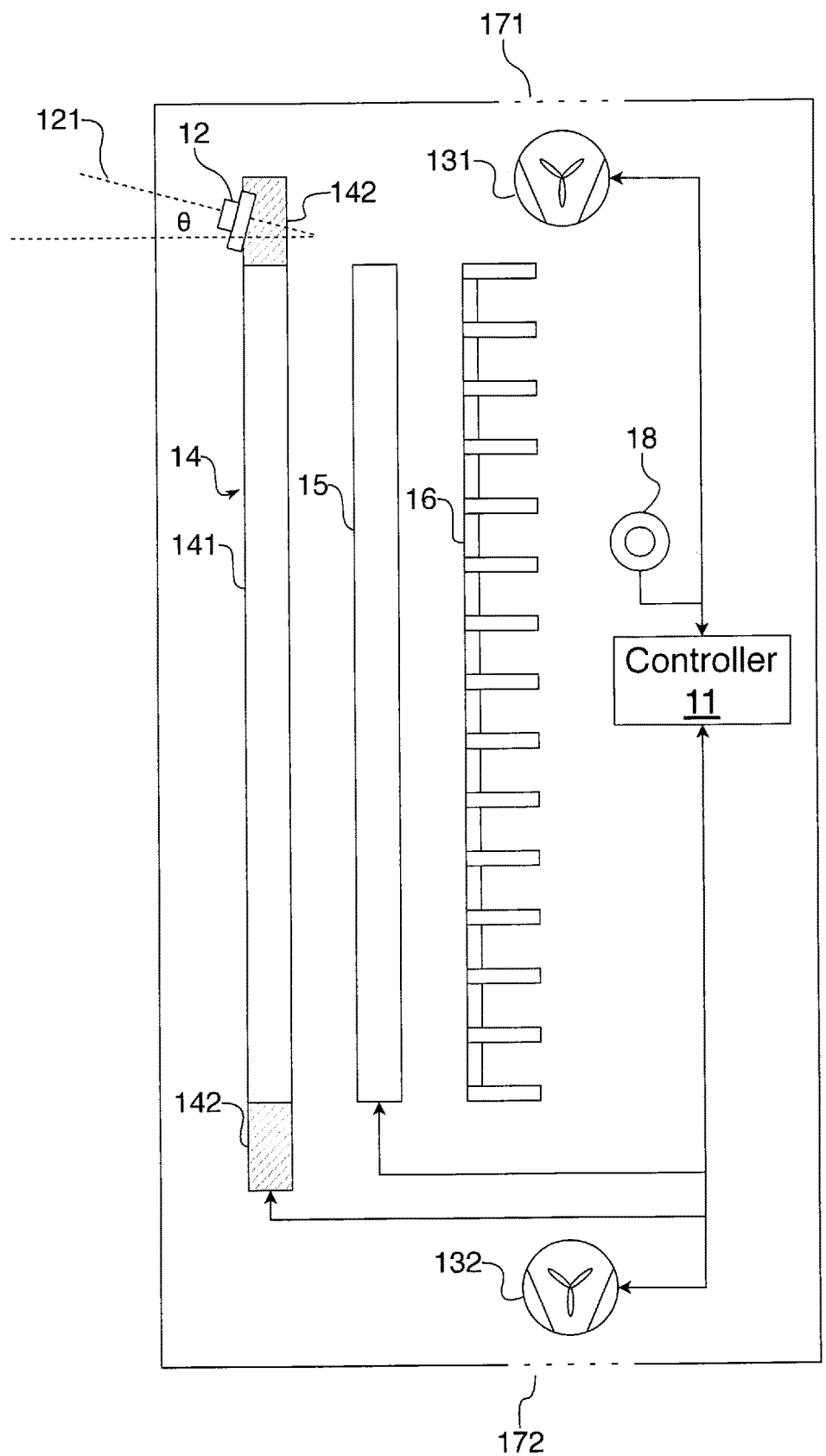
FIG. 8 illustrates a display apparatus according to some embodiments of the present disclosure.
Figure 9:
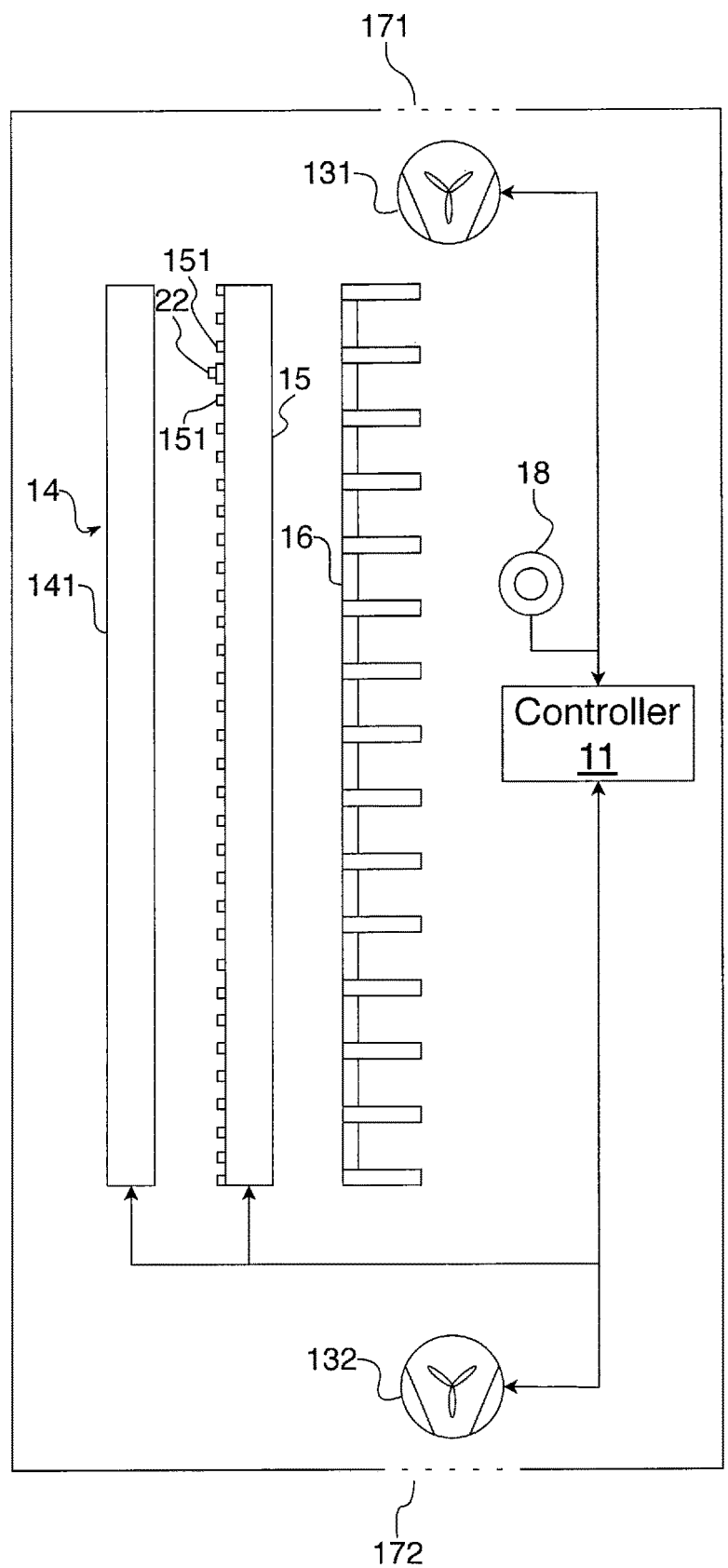
FIG. 9 illustrates a display apparatus according to some embodiments of the present disclosure.

In some embodiments, the brightness value may be output, generated, or detected by a light sensor (e.g., the light sensor 12 or 22 in FIG. 8 or 9). In some embodiments, a brightness value may be generated based on at least one detection within a time period. For example, a light sensor may perform one detection and output corresponding brightness value to a controller per one second, and the controller may collect brightness values within a time period (e.g., several seconds) and generate a corresponding brightness value (e.g., an average brightness value).

From FIG. 1, if the brightness value monitored by a controller of a display apparatus is between the thresholds TH1 and TH2, the controller may control rotational speed of a cooling fan to speed V0. The threshold TH1 may exceed the threshold TH2. If the brightness value monitored by a controller of a display apparatus is between the thresholds TH1 and TH3, the controller may control rotational speed of a cooling fan to speed V1. The threshold TH3 may exceed the threshold TH1. The speed V1 may exceed the speed V0. If the brightness value monitored by a controller of a display apparatus exceeds the threshold TH3, the controller apparatus may control rotational speed of a cooling fan to speed V3. The speed V3 may exceed the speed V1.

From FIG. 1, if the brightness value monitored by a controller of a display apparatus is between the thresholds TH2 and TH4, the controller may control rotational speed of a cooling fan to speed V2. The speed V2 may be lower than the speed V0. The threshold TH4 may be lower than the threshold TH2. If the brightness value monitored by a controller of a display apparatus is lower than the threshold TH4, the controller may control rotational speed of a cooling fan to speed V4. The speed V4 may be lower than the speed V2.

Figure 2:
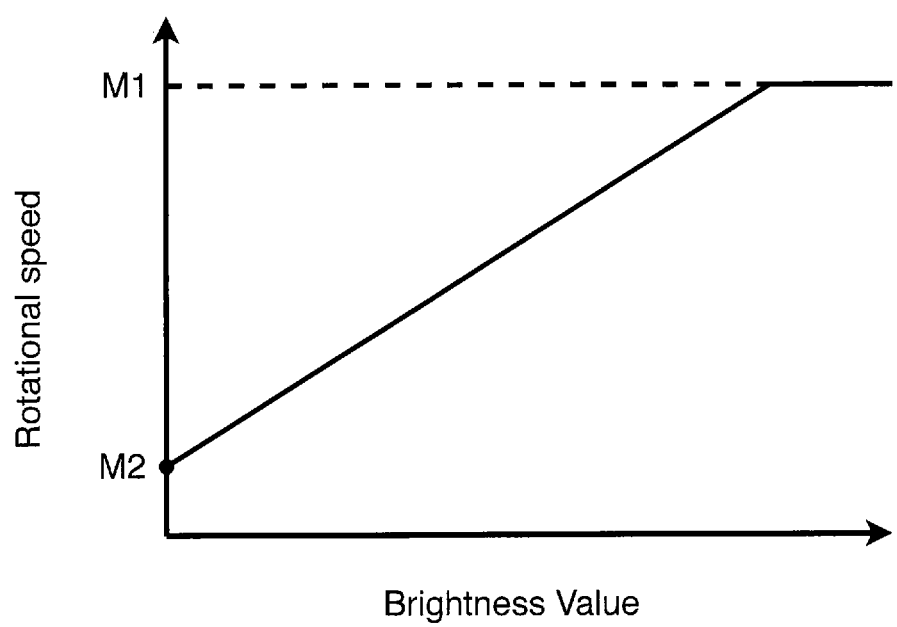
FIG. 2 illustrates the relationship between brightness values and rotational speeds according to some embodiments of the present disclosure.

FIG. 2 illustrates the relationship between brightness values and rotational speeds according to some embodiments of the present disclosure. For example, a controller of a display apparatus (e.g., the controller 11 in FIG. 8 or 9) may control one or more cooling fans (e.g., fans 131 and 132 in FIGS. 8 and 9) according to the relationship shown in FIG. 2. According to the relationship shown in FIG. 2, a controller of a display apparatus may monitor the brightness value and control the rotational speed of one or more cooling fans based thereon.

In some embodiments, the brightness value may be output, generated, or detected by a light sensor (e.g., the light sensor 12 or 22 in FIG. 8 or 9). In some embodiments, a brightness value may be generated based on at least one detection within a time period. For example, a light sensor may perform one detection and output corresponding brightness value to a controller per one second, and the controller may collect brightness values within a time period (e.g., several seconds) and generate a corresponding brightness value (e.g., an average brightness value).

From FIG. 2, if the brightness value monitored by a controller of a display apparatus increases, the controller may control the rotational speed of a cooling fan to increase commensurately. In some embodiments, the rotational speed of a cooling fan may be positively proportional to the brightness value. In some cases, if the numbers of the thresholds and corresponding speeds specified in FIG. 1 are sufficient, the relationship shown in FIG. 1 will be similar to that shown in FIG. 2.

Referring to FIG. 2, the cooling fan may have a maximum rotational speed M1. The maximum rotational speed M1 may correspond to the upper right flat part. If no brightness value is detected or received, the cooling fan may run at the minimum rotational speed. If no brightness value is detected or received, a controller of a display apparatus may control the cooling fan to run at the minimum rotational speed M2. In some cases, if no brightness value is detected or received, there may be no heat provided by the sun, and the cooling fan may be only used to dissipate the internal heat generated by the elements of the display apparatus.

Figure 3:
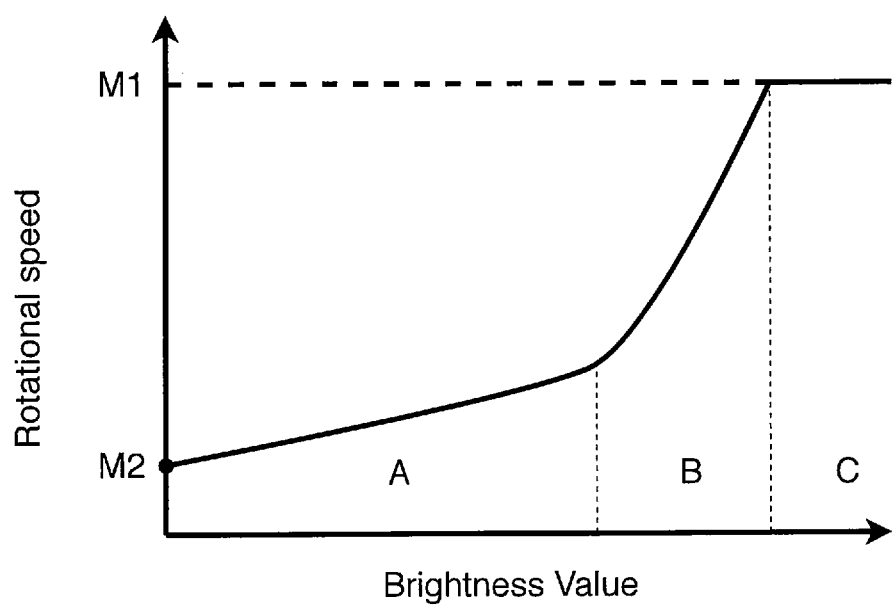
FIG. 3 illustrates the relationship between brightness values and rotational speeds according to some embodiments of the present disclosure.

FIG. 3 illustrates the relationship between brightness values and rotational speeds according to some embodiments of the present disclosure. For example, a controller of a display apparatus (e.g., the controller 11 in FIG. 8 or 9) may control one or more cooling fans (e.g., fans 131 and 132 in FIGS. 8 and 9) according to the relationship shown in FIG. 3. According to the relationship shown in FIG. 3, a controller of a display apparatus may monitor the brightness value and control the rotational speed of one or more cooling fans based thereon.

In some embodiments, the brightness value may be output, generated, or detected by a light sensor (e.g., the light sensor 12 or 22 in FIG. 8 or 9). In some embodiments, a brightness value may be generated based on at least one detection within a time period. For example, a light sensor may perform one detection and output corresponding brightness value to a controller per one second, and the controller may collect brightness values within a time period (e.g., several seconds) and generate a corresponding brightness value.

From FIG. 3, if the brightness value monitored by a controller of a display apparatus increases, the controller may control the rotational speed of a cooling fan to be higher. In section A of FIG. 3, if the brightness value monitored by a controller of a display increases, the controller may increase the rotational speed of a cooling fan. In section B of FIG. 3, if the brightness value monitored by a controller of a display apparatus increases, the controller may increase the rotational speed of a cooling fan commensurately. Upon comparison of sections A and B, the slope of section B may be higher than that of section A. For the same increase in brightness value, the increase in rotational speed in section B may exceed that of section A. For example, in section A, if the brightness value increases 10 units, the rotational speed may increase 5 units; in section B, if the brightness value increases 10 units, the rotational speed may increase 15 units.

In some cases, when the brightness provided by the sun is low (e.g., lower than a threshold), the speed of accumulating heat may increase slightly with respect to the increase in brightness, and the cooling fan with lower rotational speed may be sufficient to dissipate the heat. In some cases, when the brightness provided by the sun is high (e.g., exceeding a threshold), the speed of accumulating heat may dramatically increase with respect to the increase in brightness, such that the heat will be dissipated by the cooling fan at much higher rotational speed.

Referring to FIG. 3, the cooling fan may have the maximum rotational speed M1. The maximum rotational speed M1 may occur in the section C. If no brightness value is detected or received, the cooling fan may be controlled to run at the minimum rotational speed M2. In some cases, if no brightness value is detected or received, there may be no heat provided by the sun, and the cooling fan may be only used to dissipate the internal heat generated by the elements of the display apparatus.

Figure 4:
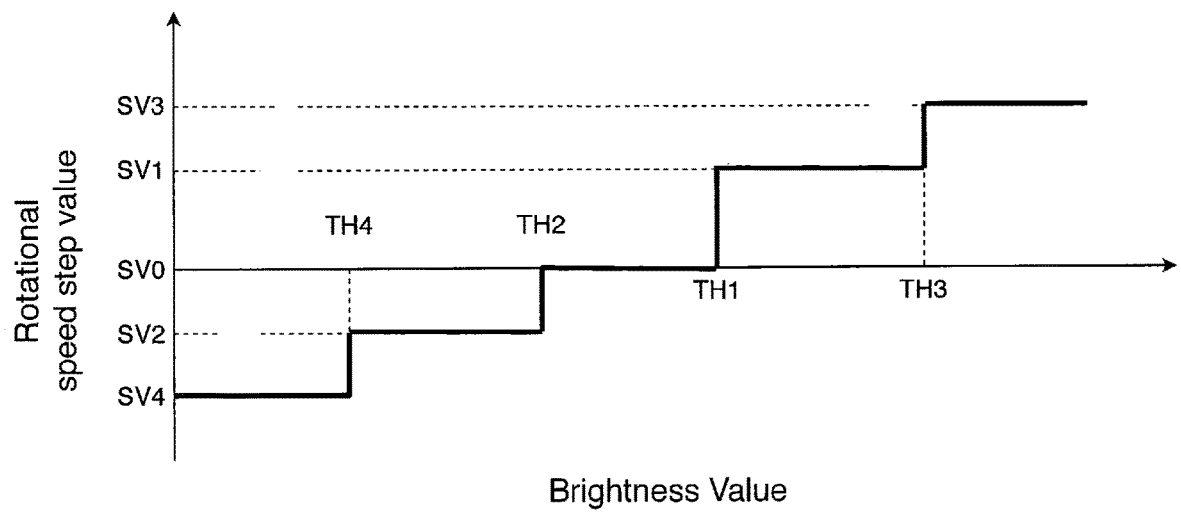
FIG. 4 illustrates the relationship between brightness values and rotational speed step values according to some embodiments of the present disclosure.

FIG. 4 illustrates the relationship between brightness values and rotational speed step values according to some embodiments of the present disclosure. For example, a controller of a display apparatus (e.g., the controller 11 in FIG. 8 or 9) may control one or more cooling fans (e.g., fans 131 and 132 in FIGS. 8 and 9) according to the relationship shown in FIG. 4. According to the relationship shown in FIG. 4, a controller of a display apparatus may monitor the brightness value and control one or more cooling fans based thereon. A controller of a display apparatus may monitor the brightness value and adjust the rotational speed of the one or more cooling fans based on the relationship between brightness values and the step values.

In some embodiments, the brightness value may be output, generated, or detected by a light sensor (e.g., the light sensor 12 or 22 in FIG. 8 or 9). In some embodiments, a brightness value may be generated based on at least one detection within a time period. For example, a light sensor may perform one detection and output corresponding brightness value to a controller per one second, and the controller may collect brightness values within a time period (e.g., several seconds) and generate a corresponding brightness value (e.g., an average brightness value).

From FIG. 4, if the brightness value monitored by a controller of a display apparatus increases, the step value of the rotational speed of a cooling fan may increase commensurately. From FIG. 4, if the brightness value monitored by a controller of a display apparatus is between the thresholds TH1 and TH2, the step value of the rotational speed may be SV0. In some embodiments, the step value SV0 may be zero. In a situation in which SV0 equals zero, if the brightness value monitored by a controller of a display apparatus is between the thresholds TH1 and TH2, the controller may not change the rotational speed of a cooling fan. The threshold TH1 may exceed the threshold TH2.

If the brightness value monitored by a controller of a display apparatus is between the thresholds TH1 and TH3, the step value of the rotational speed of a cooling fan may be SV1. The threshold TH3 may exceed the threshold TH1. The step value SV1 may exceed zero. The step value SV1 may be a positive value. That is, if the brightness value monitored by a controller of a display apparatus is between the thresholds TH1 and TH3, the controller may increase the rotational speed of a cooling fan by the step value SV1.

If the brightness value monitored by a controller of a display apparatus exceeds the threshold TH3, the step value of rotational speed of a cooling fan may be SV3. The step value SV3 may exceed the step value SV1. That is, if the brightness value monitored by a controller of a display apparatus exceeds the threshold TH3, the controller may increase the rotational speed of a cooling fan by the step value SV3. If the brightness value monitored by a controller of a display apparatus exceeds the threshold TH3, the controller may increase the rotational speed of a cooling fan faster than in a situation in which the monitored brightness value is between the thresholds TH1 and TH3.

From FIG. 4, if the brightness value monitored by a controller of a display apparatus is between the thresholds TH2 and TH4, the step value of the rotational speed of a cooling fan may be SV2. The threshold TH4 may be lower than the threshold TH2. The step value SV2 may be lower than zero. The step value SV2 may be a negative value. That is, if the brightness value monitored by a controller of a display apparatus is between the thresholds TH2 and TH4, the controller may increase the rotational speed of a cooling fan by the step value SV2 (SV2 may be a negative value). If the brightness value monitored by a controller of a display apparatus is between the thresholds TH2 and TH4, the controller may decrease the rotational speed of a cooling fan by the absolute value of the step value SV2 (i.e., |SV2|).

If the brightness value monitored by a controller of a display apparatus is lower than the threshold TH4, the step value of the rotational speed of a cooling fan may be SV4. The step value SV4 is lower than the step value SV2. That is, if the brightness value monitored by a controller of a display apparatus is lower than the threshold TH4, the controller may increase the rotational speed of a cooling fan by the step value SV4 (SV4 may be a negative value). If the brightness value monitored by a controller of a display apparatus is lower than the threshold TH4, the controller may decrease the rotational speed of a cooling fan by the absolute value of the step value SV4 (i.e., |SV4|). If the brightness value monitored by a controller of a display apparatus is lower than the threshold TH4, the controller may decrease the rotational speed of a cooling fan faster than in a situation in which the monitored brightness value is between the thresholds TH2 and TH4.

Figure 5:
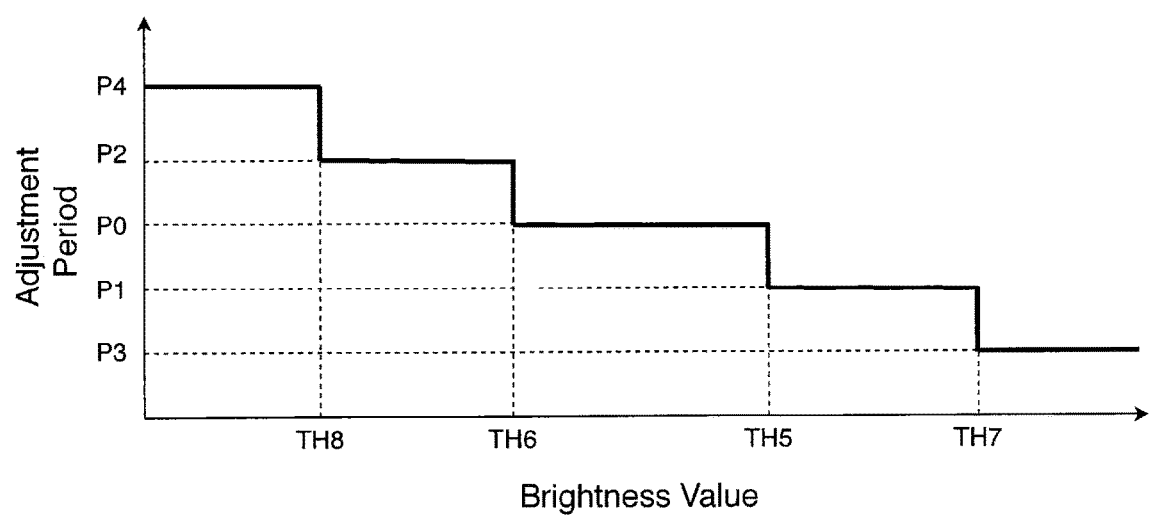
FIG. 5 illustrates the relationship between brightness values and rotational speed adjustment periods according to some embodiments of the present disclosure.

FIG. 5 illustrates the relationship between brightness values and rotational speed adjustment periods according to some embodiments of the present disclosure. For example, a controller of a display apparatus (e.g., the controller 11 in FIG. 8 or 9) may control one or more cooling fans (e.g., fans 131 and 132 in FIGS. 8 and 9) according to the relationship shown in FIG. 5. According to the relationship shown in FIG. 5, a controller of a display apparatus may monitor the brightness value and control one or more cooling fans based thereon. A controller of a display apparatus may monitor the brightness value per a time period which is based on the relationship between brightness values and the adjustment periods. A controller of a display apparatus may monitor the brightness value and adjust the rotational speed of the one or more cooling fans based on the relationship between brightness values and the adjustment periods.

In some embodiments, the brightness value may be output, generated, or detected by a light sensor (e.g., the light sensor 12 or 22 in FIG. 8 or 9). In some embodiments, a brightness value may be generated based on at least one detection within a time period. For example, a light sensor may perform one detection and output corresponding brightness value to a controller per one second, and the controller may collect brightness values within an adjustment period (which may be the adjustment period corresponding to the brightness value generated for the previous time period) and generate a corresponding brightness value (e.g., an average brightness value).

From FIG. 5, if the brightness value monitored by a controller of a display apparatus increases, the adjustment period of the rotational speed of a cooling fan may be lower. For display apparatus in direct sunlight, the monitored brightness value may be very high and the heat accumulated in the display apparatus may raise soon. It is desirable to adjust the rotational speed of the fan more frequently. From FIG. 5, if the brightness value monitored by a controller of a display apparatus is between the thresholds TH5 and TH6, the adjustment period may be P0. In other words, if the brightness value monitored by a controller of a display apparatus is between the thresholds TH5 and TH6, the controller may adjust or change the rotational speed of a cooling fan in every adjustment period P0. The threshold TH5 may exceed the threshold TH6.

If the brightness value monitored by a controller of a display apparatus is between the thresholds TH5 and TH7, the adjustment period of the rotational speed of a cooling fan may be P1. The threshold TH7 may exceed the threshold TH5. The adjustment period P1 may be lower than the adjustment period P0. That is, if the brightness value monitored by a controller of a display apparatus is between the thresholds TH5 and TH7, the controller may adjust or change the rotational speed of a cooling fan in every adjustment period P1, which may be lower than the adjustment period P0.

If the brightness value monitored by a controller of a display apparatus exceeds the threshold TH7, the adjustment period of the rotational speed of a cooling fan may be P3. The adjustment period P3 may exceed the adjustment period P1. That is, if the brightness value monitored by a controller of a display apparatus exceeds the threshold TH7, the controller may adjust or change the rotational speed of a cooling fan in every adjustment period P3, which may be lower than period P1.

From FIG. 5, if the brightness value monitored by a controller of a display apparatus is between the thresholds TH6 and TH8, the adjustment period of the rotational speed of a cooling fan may be P2. The threshold TH8 may be lower than the threshold TH6. The adjustment period P2 may exceed the adjustment period P0. That is, if the brightness value monitored by a controller of a display apparatus is between the thresholds TH6 and TH8, the controller may adjust or change the rotational speed of a cooling fan in every adjustment period P2, which may exceed the adjustment period P0.

If the brightness value monitored by a controller of a display apparatus is lower than the threshold TH8, the adjustment period P4 of the rotational speed of a cooling fan may be P4. The adjustment period P4 may exceed the adjustment period P2. That is, if the brightness value monitored by a controller of a display apparatus is lower than the threshold TH4, the controller may adjust or change the rotational speed of a cooling fan in every adjustment period P4, which may exceed the adjustment period P2. It is worth noted that the current brightness value may be generated based on one or more detections within an adjustment period, which may correspond to the previous brightness value generated with the previous time period.

In some embodiments, a controller of a display apparatus (e.g., the controller 11 in FIG. 8 or 9) may control one or more cooling fans (e.g., fans 131 and 132 in FIGS. 8 and 9) according to more than one relationship shown in FIGS. 1-5. For example, a controller of a display apparatus may control one or more cooling fans according to both the relationships shown in FIGS. 4 and 5. According to the relationships shown in FIGS. 4 and 5, a controller of a display apparatus (e.g., the controller 11 in FIG. 8 or 9) may monitor the brightness value and control the rotational speed of one or more cooling fans based on the step values and adjustment period with respect to the brightness values. In some embodiments, the thresholds TH5, TH6, TH7, and TH8 in FIG. 5 may equal but not be limited to the thresholds TH1, TH2, TH3, and TH4 in FIG. 4, respectively. In some embodiments, a brightness value may be generated based on at least one detection within a time period. In some further embodiments, a brightness value may be generated based on one or more detections within an adjustment period, which is the adjustment period corresponding to the brightness value generated for the previous time period.

Referring to FIGS. 4 and 5, if the brightness value monitored by a controller of a display apparatus is between the thresholds TH1 and TH3 and between the thresholds TH5 and TH6, the step value of the rotational speed of a cooling fan may be SV1 and the adjustment period of the rotational speed of the cooling fan may be P0. That is, if the brightness value monitored by a controller of a display apparatus is between the thresholds TH1 and TH3 and between the thresholds TH5 and TH6, the controller may increase the rotational speed of a cooling fan by the step value SV1 in every adjustment period P0, and the next brightness value may be generated based on one or more detections within the adjustment period P0.

Referring to FIGS. 4 and 5, if the brightness value monitored by a controller of a display apparatus is lower than the threshold TH4 and lower than the threshold TH8, the step value of the rotational speed of a cooling fan may be SV4 and the adjustment period of the rotational speed of the cooling fan may be P4. This may indicate that the sunlight is weak. That is, if the brightness value monitored by a controller of a display apparatus is lower than the threshold TH4 and lower than the threshold TH8, the controller may increase the rotational speed of a cooling fan by the step value SV4 (SV4 may be a negative value) in every adjustment period P4, and the next brightness value may be generated based on one or more detections within the adjustment period P4. In this case, the rotation speed of the cooling fan may decrease.

Figure 6:
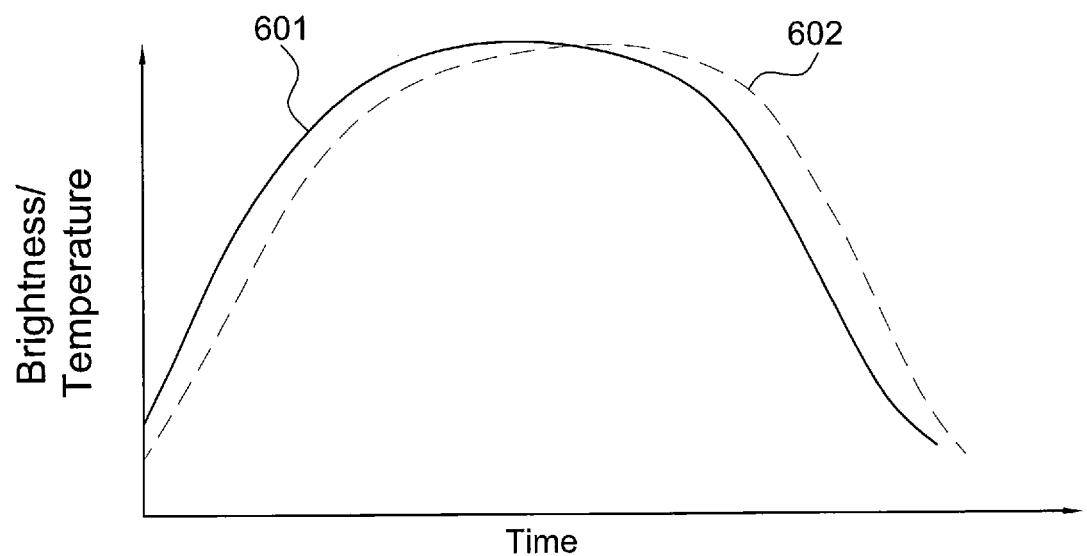
FIG. 6 illustrates curves of brightness and temperature with respect to the time according to some embodiments of the present disclosure.

FIG. 6 illustrates curves with respect to the time according to some embodiments of the present disclosure. FIG. 6 illustrates the curve of brightness 601 provided by the sun with respect to the time. FIG. 6 illustrates the curve of temperature 602 provided by the sun with respect to the time. For example, the curves of brightness 601 provided by the sun may be based on the detections by the light sensor of a display apparatus; the curve of temperature 602 due to the heat provided by the sun may be based on the detections in the housing of a display apparatus.

From FIG. 6, the peak of the curve of brightness 601 occurs prior to the peak of the curve of the temperature 602. This may be due to not much heat accumulating when the curve of brightness 601 peaks. After the peak of the curve of brightness 601 occurs, the heat accumulates quickly and dissipates slowly. Therefore, even though the brightness decreases, the temperature is still high for a long time. The time length for the curve of brightness 601 at a high level is shorter than that for the curve of temperature 602. The curve of brightness 601 from the peak decreases faster than the curve of temperature 602. In other words, the temperature in the display apparatus remains at a high level even the brightness of sun light has decreased for a while.

Figure 7:
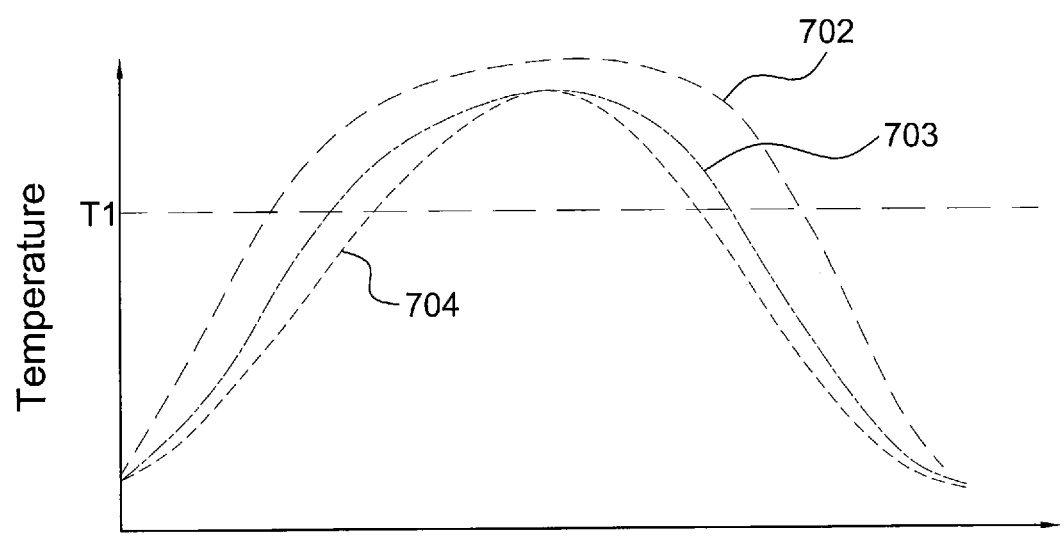
FIG. 7 illustrates curves of temperatures with respect to the time according to some embodiments of the present disclosure.

FIG. 7 illustrates curves of temperature with respect to the time according to some embodiments of the present disclosure. The curves of temperature 702-704 are measured in a display apparatus according to different cases. The curve of temperature 702 is illustrated for a situation in which the display apparatus is without any cooling means. The curve of temperature 703 is illustrated for a situation in which the display apparatus includes cooling fans controlled by temperature. The curve of temperature 704 is illustrated for a situation in which the display apparatus includes cooling fans controlled by brightness.

Because no cooling fans are used, the temperature of curve 702 is higher than that of curve 703. The peak of the curve of temperature 703 is lower than the peak of the curve of temperature 702. The entire curve of temperature 703 is substantially lower than the curve of temperature 702. The time length that the curve of temperature 703 is at a relatively high level, e.g., higher than T1, is shorter than that the curve of temperature 702 be. The rate of temperature increase in the curve of temperature 703 is lower than that of the curve of temperature 702; the slope of temperature increase of the curve of temperature 703 is lower than that of the curve of temperature 702. The rate of temperature decrease of the curve of temperature 703 may exceed that of the curve of temperature 702; the slope of temperature decrease of the curve of temperature 703 is lower than that of the curve of temperature 702. It is understood that the capability of dissipating heat of a display apparatus with cooling fans controlled by temperature exceeds that of a display apparatus without cooling fans.

The curve of temperature 704 is illustrated for a situation in which cooling fans controlled by brightness are provided. As shown in FIG. 7, the peak of the curve of temperature 704 is slightly lower than the peak of the curve of temperature 703. The curve of temperature 704 is substantially lower than the curve of temperature 703. The time length that the curve of temperature 704 is at a relatively high level, e.g., higher than T1, is shorter than that the curve of temperature 703. The rate of temperature increase in the curve of temperature 704 is lower than that of the curve of temperature 703; the slope of temperature increase in the curve of temperature 704 is lower than that of the curve of temperature 703. The rate of temperature decrease of the curve of temperature 704 may exceed that of the curve of temperature 703; the slope of temperature decrease of the curve of temperature 704 is lower than that of the curve of temperature 703. It may be understood that the capability of dissipating heat of a display apparatus with cooling fans controlled by brightness exceeds that of a display apparatus with cooling fans controlled by temperature. It may be understood that the timing of increasing or decreasing rotational speed of cooling fans controlled by brightness is more critical or more proper than that of increasing or decreasing rotational speed of cooling fans controlled by temperature. For a display apparatus with cooling fans controlled by brightness, the rotational speed of the cooling fans increases prior to the temperature rising, and the temperature is thus well controlled.

FIG. 8 illustrates a display apparatus 10 according to some embodiments of the present disclosure. The display apparatus 10 may include a controller 11, a light sensor 12, cooling fans 131 and 132, a display unit 14, a backlight module 15, a heat sink 16, vents 171 and 172, and a temperature sensor 18.

The controller 11 may be coupled with or communicated with the light sensor 12, the cooling fans 131 and 132, the display unit 14, the backlight module 15, and the temperature sensor 18. The light sensor 12 may have an axis 121. The axis 121 may be aligned with the central line of the light sensor 12. The axis 121 may form an angle θ with respect to the normal line to the display surface of the display unit 14. The angle θ may range from approximately −90° to approximately +90°.

The display unit 14 may be a liquid crystal display or a thin film transistor liquid crystal display. The display unit 14 may include an active region 141 and a boundary region 142. The active region 141 may include liquid crystals or pixels to present colors. The boundary region 142 may not include effective liquid crystals or pixels to present colors. The light sensor 12 may be disposed on the boundary regions 142 of the display unit 14. The light sensor 12 may be disposed on one side of the display unit 14. The light sensor 12 may be disposed on the surface of the display unit 14 away from the backlight module 15. The light sensor 12 may face away from the backlight module. The light sensor 12 may be used to sense or detect the brightness of the ambient light.

In some embodiments, the light sensor 12 may be disposed on the housing of the display apparatus 10. The light sensor 12 may be disposed on the surface of the housing away from the backlight module 15. The light sensor 12 may face away from the backlight module. The light sensor 12 may be used to sense or detect the brightness of the ambient light.

In some embodiments, the light sensor 12 may include a camera. The controller 11 may determine whether an object is in front of the camera based on an image generated by the camera. The controller 11 may control the cooling fan based on a previous brightness value if the object is in front of the camera (e.g., the sensor 12).

The backlight module 15 may be disposed on the other side of the display unit 14. The backlight module 15 may be disposed in back of the display unit 14. The magnitude of the light emitted from the backlight module 15 may be controlled by the controller 11 based on the brightness of the ambient light sensed or detected by the light sensor 12. The backlight module 15 may be used to illuminate the display unit 14. The backlight module may be formed with cold cathode fluorescent lamps or light emitting diodes. In some embodiments, the display unit 14 and the backlight module 15 may be formed by organic light emitting diodes or micro light emitting diodes. In a display apparatus, the backlight module 15 may generate more heat than other elements. The heat sink 16 may be disposed in back of the backlight module 15. The heat sink 16 may be closer to the backlight module 15 than other elements. The heat sink 16 may be adhered to the back surface of the backlight module 15.

The vents 171 and 172 may be used to provide a path for ambient air. The fluid flow may come from outside of the display apparatus 10, through a heat dissipating space within the display apparatus 10, and exit the display apparatus 10.

The temperature sensor 18 may be used to output temperature values to the controller 11. In some embodiments, the cooling fans 131 and 132 may not only be controlled based on the brightness sensed or detected by the light sensor 12 but also be controlled based on the temperature sensed or detected by the temperature sensor 18.

According to some embodiments of the present disclosure, the light sensor 12 senses or detects the ambient light and output a brightness value to the controller 11. In some embodiments, a brightness value may be generated based on at least one detection within a time period. For example, the light sensor 12 may perform one detection and output corresponding brightness value to the controller 11 per one second, and the controller 11 may collect brightness values within a time period (e.g., several seconds) and generate a corresponding brightness value (e.g., an average brightness value).

The controller 11 of the display apparatus 10 may control one or more cooling fans 131 and 132 according to the relationship shown in FIG. 1, 2, 3, 4, or 5. According to the relationship shown in FIG. 1, 2, or 3, the controller 11 of the display apparatus 10 may monitor the brightness value and control the rotational speed of cooling fans 131 and 132 based thereon. According to the relationship shown in FIG. 4, the controller 11 of the display apparatus 10 may monitor the brightness value and adjust the rotational speed of cooling fans 131 and 132 based on the relationship between brightness values and the step values. According to the relationship shown in FIG. 5, the controller 11 of the display apparatus 10 may monitor the brightness value per a time period which is based on the relationship between brightness values and the adjustment periods. According to the relationship shown in FIG. 5, the controller 11 of the display apparatus 10 may monitor the brightness value and adjust the rotational speed of the cooling fans 131 and 132 based on the relationship between brightness values and the adjustment periods. In some embodiments, the controller 11 of the display apparatus 10 may control cooling fans 131 and 132 according to both the relationships shown in FIGS. 4 and 5. According to the relationships shown in FIGS. 4 and 5, the controller 11 of the display apparatus 10 may monitor the brightness value per a time period and control the rotational speed of cooling fans 131 and 132 based on the step values and adjustment period with respect to the brightness values.

FIG. 9 illustrates a display apparatus 20 according to some embodiments of the present disclosure. The display apparatus 20 shown in FIG. 9 may be similar with the display apparatus 10 shown in FIG. 8. The elements of the display apparatus 20 shown in FIG. 9 may be identical to or similar with the elements of display apparatus 10 shown in FIG. 8 with the identical reference numerals. Compared with the apparatus 10 shown in FIG. 8, the apparatus 20 in FIG. 9 do not include the light sensor 12 but include the light sensor 22. In particular, the display apparatus 20 may include a controller 11, a light sensor 22, cooling fans 131 and 132, a display unit 14, a backlight module 15, a heat sink 16, vents 171 and 172, and a temperature sensor 18.

The controller 11 may be coupled with or communicated with the light sensor 22, the cooling fans 131 and 132, the display unit 14, the backlight module 15, and the temperature sensor 18. The backlight module 15 may be disposed in back of the display unit 14. The backlight module 15 may be used to illuminate the display unit 14. The backlight module may include light sources 151 (e.g., light emitting diodes). One or more light sensors 22 may be disposed between the light sources 151. One or more light sensors 22 may be used to sense or detect the ambient light and the light emitted by the backlight module 15. The magnitude of the light emitted from the backlight module 15 may be controlled by the controller 11 based on the brightness of the ambient light sensed or detected by the light sensors 22. For example, the magnitude of the light emitted from the backlight module 15 may be controlled according to the brightness of the ambient light sensed or detected by the light sensors 22 when the backlight module is turned off.

According to some embodiments of the present disclosure, the light sensors 22 sense or detect the ambient light and output a brightness value to the controller 11. In some embodiments, a brightness value may be generated based on at least one detection within a time period. For example, one or more light sensors 22 may perform one detection and output corresponding brightness value to the controller 11 per one second, and the controller 11 may collect brightness values within a time period (e.g., several seconds) and generate a corresponding brightness value (e.g., an average brightness value).

The controller 11 of the display apparatus 20 may control one or more cooling fans 131 and 132 according to the relationship shown in FIG. 1, 2, 3, 4, or 5. According to the relationship shown in FIG. 1, 2, or 3, the controller 11 of the display apparatus 20 may monitor the brightness value and control the rotational speed of cooling fans 131 and 132 based thereon. According to the relationship shown in FIG. 4, the controller 11 of the display apparatus 20 may monitor the brightness value and adjust the rotational speed of cooling fans 131 and 132 based on the relationship between brightness values and the step values. According to the relationship shown in FIG. 5, the controller 11 of the display apparatus 20 may monitor the brightness value per a time period which is based on the relationship between brightness values and the adjustment periods. According to the relationship shown in FIG. 5, the controller 11 of the display apparatus 20 may monitor the brightness value and adjust the rotational speed of the cooling fans 131 and 132 based on the relationship between brightness values and the adjustment periods. In some embodiments, the controller 11 of the display apparatus 20 may control cooling fans 131 and 132 according to both the relationships shown in FIGS. 4 and 5. According to the relationships shown in FIGS. 4 and 5, the controller 11 of the display apparatus 20 may monitor the brightness value per a time period and control the rotational speed of cooling fans 131 and 132 based on the step values and adjustment period with respect to the brightness values.

Figure 10:
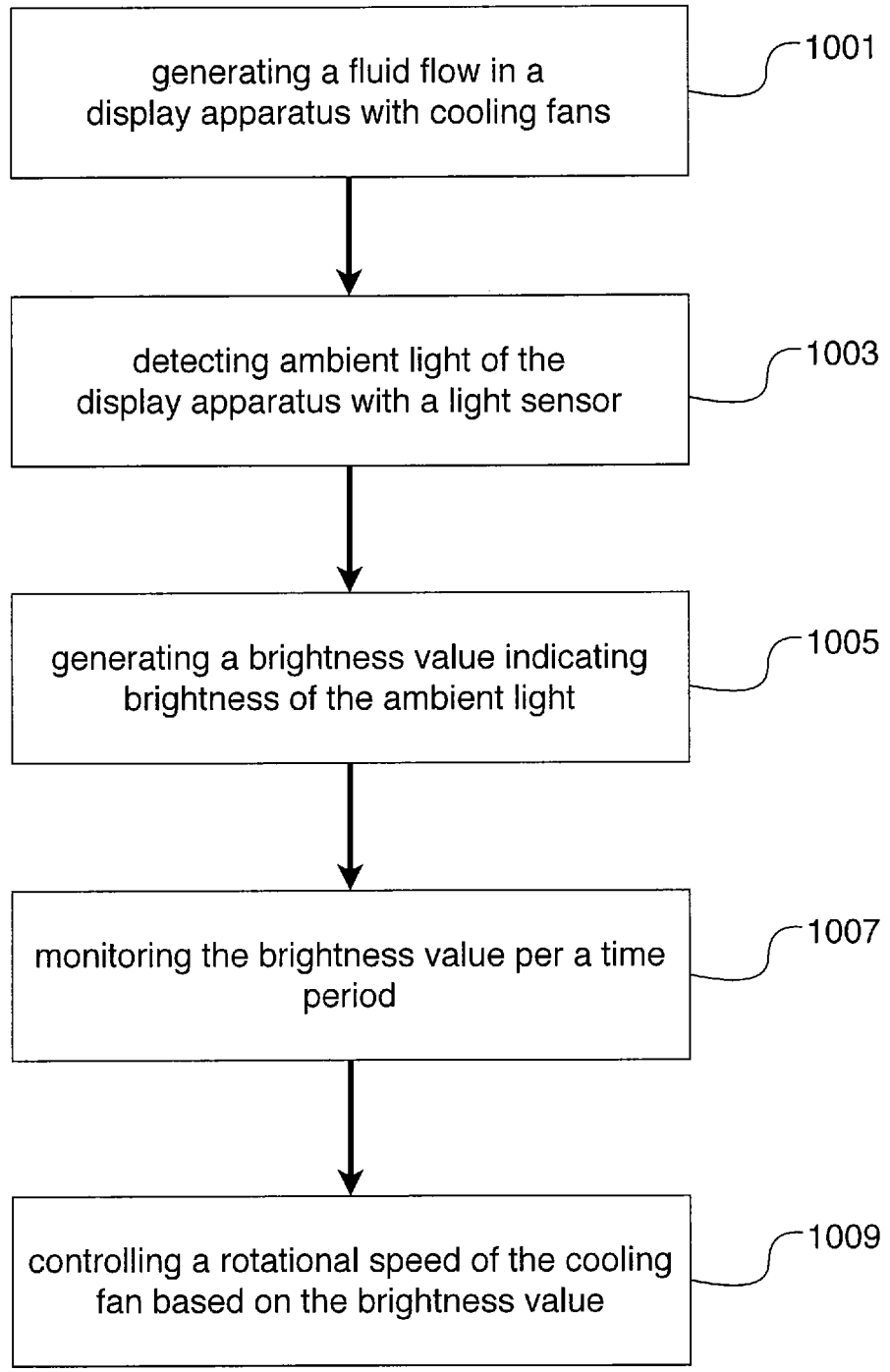
FIG. 10 is a flowchart of a method according to some embodiments of the present disclosure.

FIG. 10 illustrates a flow chart of a method performed by a controller 11 of the display apparatus 10 (or 20) according to some embodiments of the present disclosure. In operation 1001, the controller 11 may generate fluid flow in the display apparatus 10 (or 20) with cooling fans 131 and 132. The fluid flow may be airflow. In some embodiments, the fluid flow may be liquid flow. For example, a cooling liquid may flow through one or more tubes and a tank; the vents 171 and 172 may be replaced with liquid inlet and outlet; and the cooling fans 131 and 132 may be replaced with pumps.

In operation 1003, the controller 11 may detect ambient light of the display apparatus 10 with a light sensor 12. In operation 1003, the controller 11 may detect ambient light of the display apparatus 20 with a light sensor 22.

In operation 1005, the controller 11 may generate a brightness value indicating brightness of the ambient light. In operation 1007, the controller 11 may monitor the brightness value per a time period. In some embodiments of operations 1003, 1005, and 1007, the controller may detect the ambient light with the light sensor 12 or 22 and generate corresponding brightness value per one second, and the controller 11 may collect brightness values within a time period (e.g., several seconds) and generate a corresponding brightness value (e.g., an average brightness value). In some embodiments, the operation of 1007 is optional.

In operation 1009, the controller 11 may control the rotational speed of the cooling fans 131 and 132 based thereon. The brightness value may be a corresponding brightness value within a time period.

In some embodiments, operations 1009 may further comprise increasing the rotational speed of the cooling fans 131 and 132 to speed V1 when the brightness value exceeds the threshold TH1. Operations 1009 may further comprise decreasing the rotational speed of the cooling fans 131 and 132 to speed V2 when the brightness value is less than the threshold TH2. The threshold TH1 may exceed the threshold TH2.

In some embodiments, operation 1009 may further comprise increasing the rotational speed of the cooling fans 131 and 132 to speed V3 when the brightness value exceeds the threshold TH3. The threshold TH3 may exceed the threshold TH1.

In some embodiments, operation 1009 may further comprise decreasing the rotational speed of the cooling fans 131 and 132 to speed V4 when the brightness value is less than the threshold TH4. The threshold TH2 may exceed the threshold TH4.

The controller 11 may decrease the time period to the adjustment period P1 when the brightness value exceeds the threshold TH5. The controller 11 may increase the time period to the adjustment period P2 when the brightness value is less than the threshold TH6. The threshold TH5 may exceed the threshold TH6. The controller 11 may decrease the time period to the adjustment period P3 when the brightness value exceeds the threshold TH7. The threshold TH7 may exceed the threshold TH5. The controller 11 may increase the time period to the adjustment period P4 when the brightness value is less than the threshold TH8. The threshold TH6 may exceed the threshold TH8.

The controller 11 may increase the rotational speed of the cooling fans 131 and 132 proportional to the brightness value. In some embodiments, the controller 11 may increase the acceleration of the rotational speed of the cooling fans 131 and 132 in proportion to the brightness value.

The controller 11 may determine whether an object is in front the display apparatus 10 (or 20). The determination may be based on an image captured by a camera. The light sensor 12 may be a camera. When it is determined that an object is in front of the display apparatus, the rotational speed of the cooling fans 131 and 132 may be controlled based on the previous brightness value. The previous brightness value may be the brightness value generated for the previous time period.

According to the present disclosure, methods for controlling the fan based on the brightness value of ambient light are provided. It is understood that the heat provided by the sunlight may strongly affect the performance and lifetime of outdoor display apparatus. According to the present disclosure, the rotational speed of a fan increases as the strength of the sunlight increases, rather than as the temperature in the display apparatus increases. Thus, the heat provided by the sunlight can be dissipated earlier, and the damage caused by the sunlight can be eliminated.

As used herein, the singular terms "a," "an," and "the" may include plural referents unless the context clearly indicates otherwise. For example, reference to an electronic device may include multiple electronic devices unless the context clearly indicates otherwise.

As used herein, the terms "connect," "connected," "connection," "couple," "coupled," refer to an operational coupling or linking. Connected components can be directly or indirectly coupled to one another through, for example, another set of components.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless otherwise specifically indicated herein, the order and grouping of the operations are not limitations of the present disclosure.

What is claimed is:

1. A display apparatus, comprising:
a display unit;
a light sensor configured to detect an ambient light and generate a brightness value indicating brightness of the ambient light;
a cooling fan configured to generating a fluid flow in the display apparatus; and
a controller configured to monitor the brightness value and control a rotational speed of the cooling fan based on the brightness value,
wherein the controller is configured to monitor the brightness value per a time period,
the controller is configured to decrease the time period to a first period when the brightness value is greater than a first threshold;
the controller is configured to increase the time period to a second period when the brightness value is smaller than a second threshold; and
the first threshold is greater than the second threshold.

2. The display apparatus of claim 1, further comprising:
a backlight module located on a first side of the display unit,
wherein the light sensor is located on a second side of the display unit different from the first side and faces away from the display unit, and
wherein the controller is configured to control light emitted from the backlight module based on the brightness value.

3. The display apparatus of claim 2, wherein the light sensor has an axis forming an angle from approximately −90° to approximately +90° with respect to a normal line to a display surface of the display unit.

4. The display apparatus of claim 1, further comprising:
a backlight module located on a first side of the display unit,
wherein the light sensor is located on the backlight module and is configured to detect the ambient light and light emitted by the backlight module.

5. The display apparatus of claim 4, wherein a brightness of the backlight module is controlled according to the brightness value detected when the backlight module is turned off.

6. The display apparatus of claim 1, wherein:
the light sensor includes a camera,
the controller is configured to determine whether an object is in front of the camera based on an image generated by the camera, and
the controller is configured to control the cooling fan based on a previous brightness value when the object is determined to be in front of the camera.

7. The display apparatus of claim 1, wherein:
the controller is configured to increase the rotational speed of the cooling fan to a first value when the brightness value is greater than a first threshold,
the controller is configured to decrease the rotational speed of the cooling fan to a second value when the brightness value is smaller than a second threshold, and
the first threshold is greater than the second threshold.

8. The display apparatus of claim 7, wherein:
the controller is configured to increase the rotational speed of the cooling fan to a third value when the brightness value is greater than a third threshold, and
the third threshold is greater than the first threshold.

9. The display apparatus of claim 7, wherein:
the controller is configured to decrease the rotational speed of the cooling fan to a fourth value when the brightness value is smaller than a fourth threshold, and the second threshold is greater than the fourth threshold.

10. The display apparatus of claim 1, wherein the controller is configured to decrease the time period to a third period when the brightness value is greater than a third threshold, and the third threshold is greater than the first threshold.

11. The display apparatus of claim 1, wherein the controller is configured to increase the time period to a fourth period when the brightness value is smaller than a fourth threshold and the fourth threshold is smaller than the second threshold.

12. The display apparatus of claim 1, wherein the rotational speed of the cooling fan increases in proportional to the brightness value.

13. The display apparatus of claim 1, wherein an acceleration of the rotational speed of the cooling fan increases in proportional to the brightness value.

14. A method for controlling a display apparatus, the method comprising:
generating a fluid flow in a display apparatus with a cooling fan;
detecting ambient light of the display apparatus with a light sensor;
generating a brightness value indicating brightness of the ambient light;
monitoring the brightness value; and
controlling a rotational speed of the cooling fan based on the brightness value, wherein the brightness value is monitored per a time period;
decreasing the time period to a first period when the brightness value is greater than a first threshold; and
increasing the time period to a second period when the brightness value is smaller than a second threshold;
wherein the first threshold is greater than the second threshold.

15. The method of claim 14, wherein controlling the rotational speed of the cooling fan comprises:
increasing the rotational speed of the cooling fan to a first value when the brightness value is greater than a first threshold; and
decreasing the rotational speed of the cooling fan to a second value when the brightness value is smaller than a second threshold,
wherein the first threshold is greater than the second threshold.

16. The method of claim 15, wherein controlling the rotational speed of the cooling fan comprises:
increasing the rotational speed of the cooling fan to a third value when the brightness value is greater than a third threshold,
wherein the third threshold is greater than the first threshold.

17. The method of claim 15, wherein controlling the rotational speed of the cooling fan comprises:
decreasing the rotational speed of the cooling fan to a fourth value when the brightness value is smaller than a fourth threshold,
wherein the second threshold is greater than the fourth threshold.

18. The method of claim 14, further comprising:
decreasing the time period to a third period when the brightness value is greater than a third threshold,
wherein the third threshold is greater than the first threshold.

19. The method of claim 14, further comprising:
increasing the time period to a fourth period when the brightness value is smaller than a fourth threshold,
wherein the second threshold is greater than the fourth threshold.

20. The method of claim 14, wherein the rotational speed of the cooling fan increases in proportion to the brightness value.

21. The method of claim 14, wherein an acceleration of the rotational speed of the cooling fan increases in proportion to the brightness value.

22. The method of claim 14, further comprising:
determining whether an object is in front of the display apparatus, and
wherein the rotational speed of the cooling fan is controlled based on a previous brightness value when the object is in front of the display apparatus.

* * * * *